Nov. 3, 1959 H. SCHRÖDER 2,911,574

POLARIZED RELAY

Filed June 2, 1954 4 Sheets-Sheet 1

INVENTOR
H. SCHRODER

BY R. H. Morris

ATTORNEY

Nov. 3, 1959 H. SCHRÖDER 2,911,574
POLARIZED RELAY
Filed June 2, 1954 4 Sheets-Sheet 2

INVENTOR
H. SCHRODER
BY
R. F. Morris
ATTORNEY

Nov. 3, 1959 H. SCHRÖDER 2,911,574

POLARIZED RELAY

Filed June 2, 1954 4 Sheets-Sheet 3

INVENTOR
H. SCHRODER
BY R. F. Morris
ATTORNEY

INVENTOR
H SCHRODER
BY R. P. Morris
ATTORNEY

United States Patent Office 2,911,574

Patented Nov. 3, 1959

2,911,574

POLARIZED RELAY

Heinrich Schröder, Pforzheim, Germany, assignor to International Standard Electric Corporation, New York, N.Y., a corporation of Delaware Application June 2, 1954, Serial No. 434,030

Claims priority, application Germany June 5, 1953

7 Claims. (Cl. 317—150)

This invention relates to a polarized relay and more particularly to a multi-position relay.

Multi-position relays are particularly useful to control the switching of frequency determining elements in radio communications equipment and are particularly advantageous for use in conjunction with mobile radio equipment. In mobile radio equipment, due to space limitations, the receiving and transmitting equipment is situated remotely from the operator and he therefore must have some means of remotely controlling the frequency receiver and/or transmitting characteristics of the equipment.

As is well known, piezo-electric elements are generally used for the purpose of maintaining constant frequency characteristics of a transmitter or receiver and where the equipment is to selectively receive a number of channels of different frequency, piezo-electric elements are selectively switched into and out of circuit. Since the piezo-electric elements are generally placed adjacent the equipment they control, switching means for switching desired elements into and out of circuit are necessary.

It has been known from the prior art to use a plurality of relays to control the switching into and out of circuit of piezo-electric elements, but each relay requires its separate control path and therefore is uneconomical.

It has also been known to utilize rotary switches for selecting frequency determining elements but these switches require special devices for the generation and conversion of impulses. The impulses step these rotary switches around and therefore, they are very sensitive and subject to being moved by transmitted shock incident to the movement of the vehicle in which the equipment is mounted.

It is also known to use switches which are expensive and which require a galaxy of equipment such as gears, counters, auxiliary fasteners, brakes, etc. rendering their use uneconomical.

Applicant's invention, on the other hand, provides a simple, economical and efficient device for remote switching purposes. Such a relay by means of three conductors interconnecting a control switch from the operator's position and the relay at a remote point in the vehicle, is able to selectively insert any one of twelve (12) frequency-determining elements into circuit and with the advantage that after selection to the proper angular position of the relay, the relay is deenergized and is locked into angular position.

It is an object of the invention therefore, to provide a polarized relay which is characterized in that its armature is displaceable in the direction of its axis and is capable of being turned in either direction of rotation around its axis into a number of desired, fixed switching positions by the selective polarizations of the associated yoke components. The polarization of the yoke components or poles is effected by a predetermined combination of positive, negative and/or equal potentials to the pole windings.

It is a further object of the invention to provide a feed circuit for a polarized relay which is energized only during the period of the actuation thereof, and is deenergized automatically at the conclusion of each switching operation.

The foregoing and other features of the invention will be better appreciated when reference is had to the following description and to the accompanying drawings in which.

Figure 1:
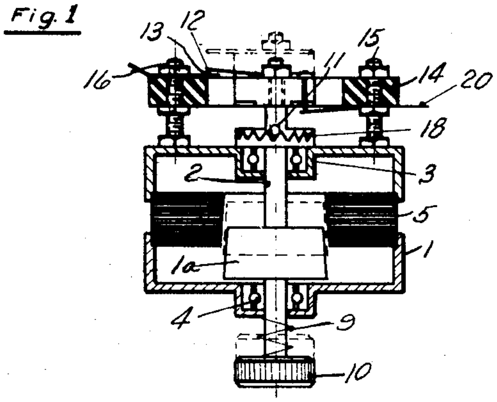
Fig. 1 is a sectional elevation of an embodiment of the relay according to the invention.
Figure 3:
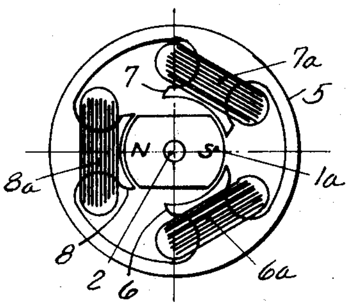

Referring now to Figs. 1 and 3, a polarized relay consists of a fixed frame 1 and a rotary armature 1*a* having a frusto-conical shape. The armature 1*a* is coaxially mounted on rotary shaft 2 which extends through the frame 1. The armature 1*a* is a permanent magnet having a diametric polarization. The shaft 2 is mounted pivotally in bearings 3 and 4 which bearings are situated at opposite sides of the frame 1. The length of the shaft 2 is such that it is displaceable in a longitudinal direction through the bearings 3 and 4.

Figure 6:
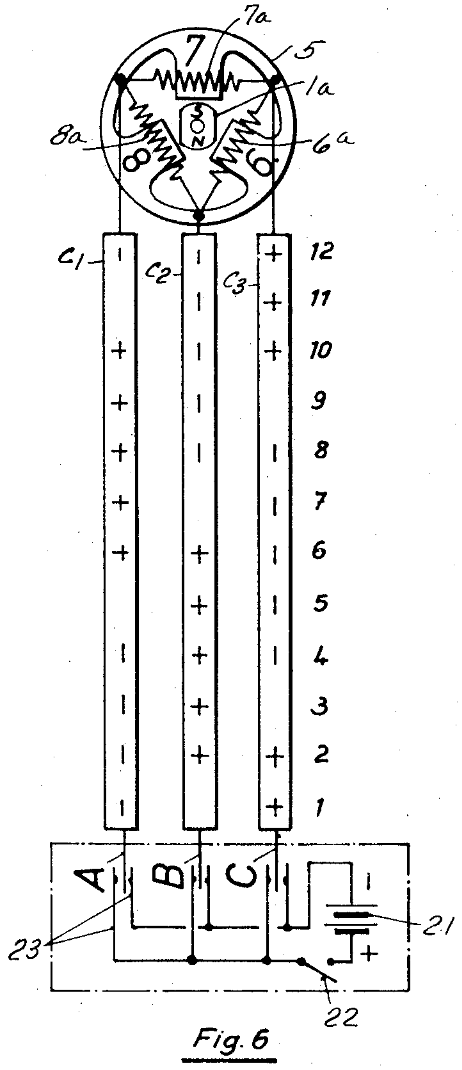
Fig. 6 is a schematically represented view of a polarization chart according to the example of embodiment of the invention.

A soft iron yoke 5 having three poles 6, 7 and 8 is provided, each pole disposed in a circle about the armature and separated 120° from the other. The poles have a conical bore which is complementary to the conical shape of the armature, so that the armature may nest in a line with the poles as shown in dotted line in Fig. 1. Each pole is provided with a wire winding, 6*a*, 7*a* and 8*a*, respectively as shown in Fig. 3 and, which are connected, as shown in Fig. 6, in delta fashion.

The armature 2 is normally urged in a downward direction by the action of spring 9 against knob 10 which knob is fastened to the lower end of the shaft 2. The spring 9 exerts tension against the knob 10 because it is compressed against one side of the frame 1.

The end of shaft 2 which extends from the opposite side of frame 1 carries a detent rod 11 extending diametrically through the shaft 2. Attached to the end of shaft 2 is a switch rotary arm 12. Cooperating with the rotary arm 12 are a group of radially disposed fixed contacts 13 mounted on an insulating ring 14. The ring 14 is mounted to the frame 1 by means of screws 15 and nuts 16. The detent rod 11 is adapted to cooperate with the serrated annulus 18 which is mounted on the outside of frame 1. A brush contact 20 is adapted to cooperate with rotary contact arm 12 and it may be electrically insulated from the frame 1 by any suitable means. Referring again to Fig. 6 which is in part, a schematic chart, there will be seen three conductors C1, C2 and C3 which are connected in delta fashion to the junctions of the windings 6*a*, 7*a* and 8*a*. These conductors would be the conductors which interconnect the relay with the control switch in a vehicle. The end of the conductors C1 . . . C3 are brought to the fixed contacts A, B and C, respectively. A source of potential 21 is adapted to be selectively connected to the conductors C1 . . . C3 when a main switch 22 is closed and when any of the movable contacts 23 are moved to cooperate with fixed contacts A, B or C. It will be noted that if a lefthand movable contact 23 is moved into contact with its corresponding fixed contact that a positive potential will be applied to one of the conductors C1 . . . C3. It will be also understood that if the righthand movable contact 23 is caused to contact its associated fixed contact that a negative potential will be applied to the appropriate conductor C1 . . . C3. By following a permutation code for moving the movable contacts into contact with their associated fixed contacts, a potential distribution such as indicated in Fig. 6 may be achieved. It will be understood that by reason of the delta connection of the windings 6a . . . 8a, that the resultant magnetic field emanating from the poles 6, 7 and 8 is disposed about a common axis and through which axis the armature 1a is mounted. Thus, the armature 1a will assume a predetermined angular position depending upon the resultant field produced as indicated in Fig. 6.

Figure 2:
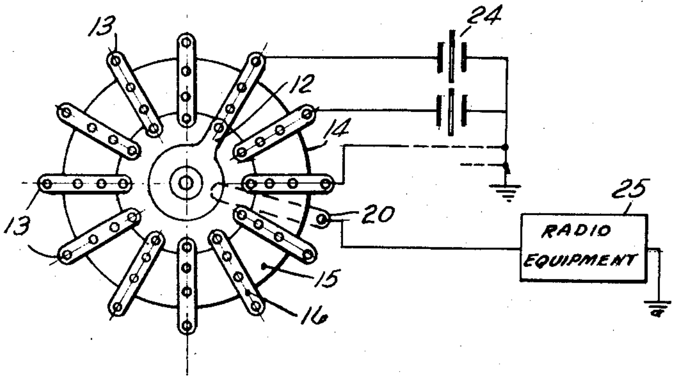
Figs. 2 to 5 show some details regarding Fig. 1.

In Fig. 2, there is schematically shown a connection for piezo-electric elements 24 to each of the fixed contacts 13 and with a connection from the brush wiper 20 to a piece of radio equipment 25 indicated in block form. The operation of the structure disclosed in Fig. 1 is such that when the field windings 6a . . . 8a are energized the armature 1a is attracted upwardly within the resultant field of the windings and thereupon rotates to a position wherein the flux lines from the field and the armature are in a common path. It will be observed that when the armature 1a moves into the field of the windings, that detent rod 11 is disengaged from the teeth of the annular serrated ring 17. The movable contact arm 12 is similarly disengaged from contact with any other fixed contacts 13. Upon deenergization of the windings 6a . . . 8a, the spring 9 urges the shaft and armature downwardly resulting in the reestablishment of contact between the movable contact arm 12 and one of the fixed contacts 13 resulting in the switching of a predetermined element 24 into a circuit of the equipment 25. Similarly, the detent pin 11 engages between adjacent teeth of the annulus 18.

In the structure shown in Fig. 1 only one switching plane or level has been shown but it will be understood that a switching level could be utilized wherein the movable contact arm 12 would cooperate with another group of fixed contacts whilst in its upper position.

Figure 8:
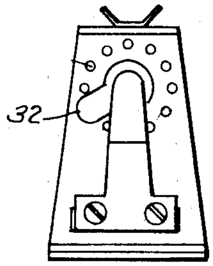
Figs. 8 and 9 show some details regarding Fig. 7.
Figure 7:
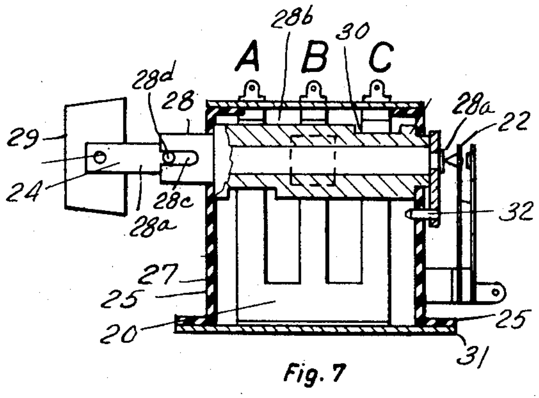
Fig. 7 is a sectional elevation of a control switch according to the invention.
Figure 9:
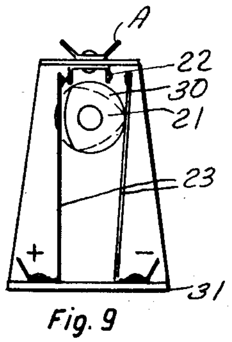

In order to achieve the code permutation capable of giving the angular rotation required to selectively switch into the number of positions shown in Fig. 1, a control switch is required and is a proper sub-combination of the invention thus far disclosed. The control switch as shown in Figs. 7, 8 and 9 is capable of giving the permutation shown in the chart of Fig. 6. The control switch 26 consists of a housing 27 which may conveniently be of electrical insulating material, a rotary member 28 extending through two sides of the housing 27 and adapted to be rotated therein. The rotor is made up of two portions, a shaft 28a and a cam sleeve 28b. The shaft 28a is adapted to be rotated by means of knob 29 attached to one end thereof. Shaft 28a is adapted to be moved in a longitudinal direction within the sleeve 28b a distance defined by the slot 28c which is cut into one end of the sleeve 28b. Driving pin 28d extends diametrically through shaft 28a and cooperates with the slot 28c. The pin is adapted to transfer rotary motion to the sleeve 28b. A pair of contacts 22 are located externally of the housing 27 and are adapted to be operated by the end of shaft 28a when the shaft is moved longitudinally within the sleeve 28b.

The cam sleeve 28b is provided with a plurality of differently cut cam surfaces 30 along the length thereof. As shown in Fig. 9 a plurality of fixed contact pairs A, B and C are connected to the top of the housing 27 in spaced relation to the other pairs; the spacing between adjacent pairs coinciding with the distance between adjacent cam surfaces 30 on the sleeve 28b. The contact surfaces of each pair of contacts are oppositely disposed and face in a direction normal to the axis of the rotor member 28.

Figure 5:
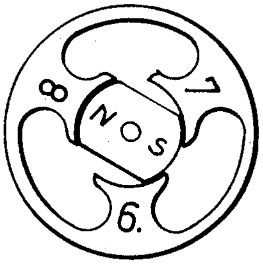
Figure 4:
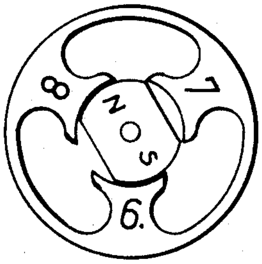

Cooperating with the fixed contacts, I provide pairs of movable contacts 23, one pair associated with each pair of fixed contacts. The movable contacts are mounted on the base 31 of the housing 27 and extend tangentially to the cam sleeve 28b and abut thereagainst. The cam surfaces 30 are so cut that predetermined of the movable contacts 23 are permitted to close and make contact with their associated fixed contacts A . . . C. A stop pin 32 is attached to the rotor 28 to limit the angular motion thereof. Figs. 4 and 5 illustrate the angular position which will be assumed by the armature 1a when the knob 29 of the control switch causes the movable contacts 23 to assume the permutation number 4 wherein negative potentials are applied across winding 7a and a positive potential is applied to the junctions of windings 6a and 7a. It will be apparent that pole 7 is ineffective since both ends of the winding 7a are at the same potential.

In Fig. 5 it is assumed that the knob 29 of the control switch was turned so that permutation number 3 is applied to the conductor C1 . . . C3. In this case, no potential is applied to the junction of windings 6a and 7a, a positive potential is applied to the junction of windings 6a and 8a and a negative potential is applied to the junction of windings 7a and 8a. The north pole of armature 1a is attracted to pole piece 8 since it represents an electro-magnet whose end is magnetized to a south polarity.

A brief description of the operation of the relay will now be given. Control knob 29 is urged longitudinally through the sleeve 28b thereby to close contacts 22. Contacts 22 thereupon will apply the potential from source 21 to the opposite movable contacts 23, as shown in Fig. 6. The angular movement of knob 29 now causes the setting of movable contacts 23 and the energization of the windings 6a . . . 8a and the armature 1a is attracted into the field of the windings and caused to rotate to a predetermined angular position depending upon resultant magnetic fields created by the windings. Both the detent pin 11 and the movable contact arm 12 are thereby raised and upon release of the knob 29 and the opening of contacts 22, the windings 6a . . . 8a become deenergized, spring 9 urges the armature 1a in a downward position; detent pin 11 locks between teeth of the serrated annulus 18 and movable contact arm 12 makes contact with an appropriate fixed contact 13.

Figure 12:
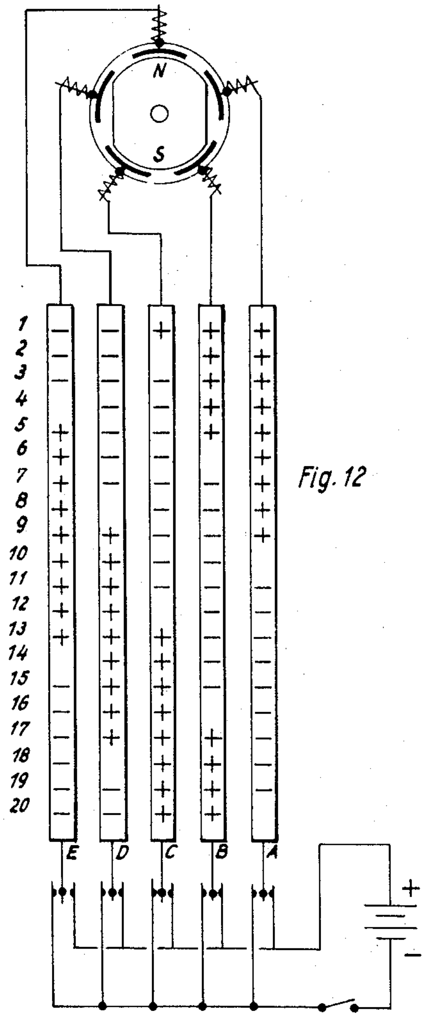
Fig. 12 shows schematically a further example of an embodiment of a polarization chart according to the further embodiment.
Figure 11:
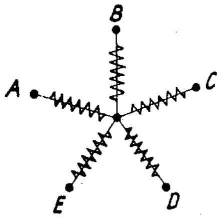
Fig. 11 shows schematically a representation of a circuit for the pole windings.
Figure 10:
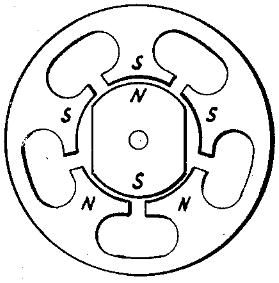
Fig. 10 shows one detail of a modified example of an embodiment of the invention.

The number of possible switch positions obtainable may be increased by the use of a greater number of pole pieces and corresponding windings as shown, for instance, in Figs. 10, 11 and 12. In the embodiment shown in these last named figures, five (5) windings are utilized connected in a star circuit. In the event that the star circuit is utilized, additional movable contacts 23 will be required, one pair for each winding. Fig. 12 shows a permutation code capable of giving twenty (20) possible switching positions. It will be understood, of course, that there will be twenty (20) fixed contacts connected with the relay, each contact spaced around an arc at an angle of 18° from its adjacent contact.

If the frequency determining elements 24 are connected similarly to a decimal or decade combination, then it would be possible to remotely switch such elements into circuit by the use of two, three-polar systems and two control switches by the use of six conductors to give a total of 144 possible different frequency channels. If two, five-polar systems are used with ten conductors, it is possible to selectively switch to any one of four-hundred (400) different channels.

It will be understood, of course, that the invention is not in any way limited to the example shown but is applicable to all kinds of circuits wherein any one of a plurality of positions is desired. It is also possible, for instance, that a plurality of relays of the type disclosed may be arranged separately at different locations and they may be simultaneously and remotely controlled by means of a single control switch, the relays being connected in parallel to the conductors C1 . . . C3.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A polarized multi-position relay comprising a plurality of fixed windings adapted to produce a resultant magnetic field disposed about a common axis, a plurality of fixed contacts concentrically disposed about said axis, an armature having a permanent magnetic polarization, means for rotatably mounting said armature in said common axis, means for normally preventing angular displacement of said armature means for normally urging said armature along the line of said axis out of the field of said windings and into cooperation with said angular displacement preventing means, rotatable switch means coupled to said armature and cooperating with said fixed contacts, and means coupled to said windings for selectively producing a resultant magnetic field among said windings, for urging said armature within said resultant field out of cooperation with said angular displacement preventing means and for rotating said armature to a predetermined angular position.

2. A polarized relay as claimed in claim 1, further comprising a fixed frame, said windings and said rotatable mounting means mounted on said frame, said means for normally preventing angular displacement of said armature comprising fixed detent means mounted on said frame, movable detent means attached to said armature, both said detent means adapted to normally cooperate in the absence of any existing magnetic field among said windings.

3. A polarized relay as claimed in claim 2, wherein said fixed contacts are angularly spaced on said frame, a given of said contacts adapted to normally cooperate with said movable contact means dependent upon the angular position of said armature.

4. A polarized relay as claimed in claim 3, further comprising an insulating ring mounted on said frame, said fixed contacts mounted on said ring concentrically about said common axis.

5. A polarized relay as claimed in claim 1, wherein said armature is frusto-conically shaped, the axis of the cone coinciding with said common axis.

6. A polarized relay as claimed in claim 1, further comprising a common core of magnetic material, said core having a plurality of pole pieces equidistantly disposed about said common axis, each of said windings wound around a different one of said pole pieces.

7. A polarized relay as claimed in claim 6, wherein said pole pieces have a conical bore complementary to the dimensions of said armature.

References Cited in the file of this patent

UNITED STATES PATENTS

| | | |
|---|---|---|
| 1,638,614 | Brewster | Aug. 9, 1927 |
| 1,800,760 | Sleeper | Apr. 14, 1931 |
| 2,327,792 | Hubbard | Aug. 24, 1943 |
| 2,447,343 | Kelly | Aug. 17, 1948 |
| 2,640,895 | Boswau | June 2, 1953 |

FOREIGN PATENTS

| | | |
|---|---|---|
| 679,047 | Germany | Aug. 17, 1939 |